April 22, 1952     W. F. ALLER     2,593,958
APPARATUS FOR GAUGING AND FOR SELECTING
ARTICLES ACCORDING TO SIZE
Filed Sept. 10, 1949     2 SHEETS—SHEET 1

INVENTOR
W. F. Aller
BY
Edward J. Noe
ATTORNEY

Patented Apr. 22, 1952

2,593,958

UNITED STATES PATENT OFFICE 2,593,958

APPARATUS FOR GAUGING AND FOR SELECTING ARTICLES ACCORDING TO SIZE

Willis Fay Aller, Dayton, Ohio, assignor to The Sheffield Corporation, Dayton, Ohio, a corporation of Ohio Continuation of application Serial No. 660,902, April 10, 1946. This application September 10, 1949, Serial No. 114,935

9 Claims. (Cl. 209—82)

This invention relates to gauging apparatus and more particularly to apparatus for gauging articles supplied to the apparatus and selecting the articles in accordance with different size requirements, this application being a continuation of application Serial No. 660,902, filed April 10, 1946, for Gauging and Selecting Apparatus.

One object of the invention is the provision of a gauging apparatus capable of rapidly gauging articles, with high accuracy, and provided with simple means for selecting the articles according to size.

Another object of the invention is the provision of a gauging and selecting apparatus having a fluid pressure gauging nozzle or orifice through which a leakage of air or other fluid takes place to an extent determined by the size of the article, such nozzle controlling the pressure of a plurality of expansible pressure responsive means which in turn control a plurality of electric gauging circuits.

Another object is the provision of a gauging and selecting apparatus embodying a plurality of pressure responsive elements operable independently of one another and controlled in accordance with the amount of leakage of air or other fluid at a gauging station, the pressure responsive elements controlling electrical controlling members having circuit connections to a number of controlling devices that select the gauged articles according to size.

Another object is the provision of a gauging device of the character mentioned having means providing a preliminary gauging operation on the articles before they are supplied to the main station and for automatically ejecting articles that are too large or too small to conform to a required rather wide range of sizes.

Another object is the provision of an automatic selecting device having a series of gauging pressure responsive elements operable in a fluid pressure size gauging system in accordance with the size of the object gauged, each gauging element controlling a plurality of circuits so that one of the elements effects a segregation of those articles that are above a predetermined range of sizes in one group and those that are below a predetermined range of sizes in another group, while that group that is within a specified range is further divided by another element and its circuits into three subdivisions.

Other objects and advantages of the invention will be apparent from the following description, the appended claims, and the accompanying drawing, in which, Fig. 1 is a side elevation, partially in central vertical section, showing a gauging and selecting apparatus embodying the present invention;

Fig. 9 is a detail sectional view of a portion of one pair of switch blades.

Figure 1:
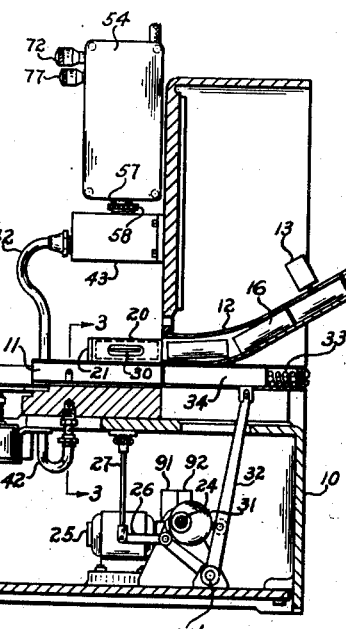

Referring more particularly to the drawing in which the same reference numerals are applied to like parts in the different views, the gauging and selecting apparatus, as herein illustrated for exemplary purposes, comprises a housing or support 10 providing a gauging station 11 to which workpieces are successively applied. In accordance with the preferred embodiment of the invention the workpieces are supplied in a line of advance and are automatically moved by a suitable feeding device into the gauging position, the moved piece pushing the workpiece that was previously gauged out of the gauging station and onto a discharge guide. While the actual selection of the workpieces may be accomplished in different ways as for example by differently marking or by segregating into different groups according to the results of the gauging operation, in the particular embodiment illustrated the path of travel of the gauged workpiece is automatically controlled during gravity descent by gates controlled by the several electrical circuits so that the various articles travel to different selected places according to size. This grouping is in accordance with the diameter of the workpiece in the particular embodiment illustrated.

The workpieces may be of any suitable form, being herein shown as cylindrical bars, pistons or pins, such as piston pins. The term "workpiece" is used as a designation of any object or part to be gauged. These workpieces travel down an inclined supply tube 12 and before they reach the main gauging station they are subjected to a preliminary gauging operation which determines whether or not the diameter of the workpiece is excessively large or excessively small. Those that are excessively large or excessively small, and that should be rejected, are moved laterally out of the advancing line, and those that fall within the limits of a predetermined rather wide or acceptable range of sizes move along through the supply tube to a point adjacent the gauging station.

The preliminary gauging device comprises a suitable electrical gauge 13 which may be located adjacent a straight portion of the supply tube 12 and having a work engaging plunger operable through an opening in the wall of the tube 12 and engaging the workpiece. This gauge 13 is preferably of the character shown in Aller patent 2,384,519, granted September 11, 1945. If either one of its two switches is open at the time current is supplied to those switches during the preliminary gauging operation, caused by the workpiece being too large or too small to satisfy the tolerances required, an ejection solenoid 14 will be energized and its solenoid plunger 15 will move the workpiece 16 laterally out of the line of advance so that it may travel down an inclined track 17 of a suitable collection receptacle. If neither of the switches is open, the workpiece continues its descent along the supply tube until it reaches the bottom of the tube. The weight of the line of workpieces moves the lowermost piece out of the tube to a stand 20 having an end 21 that stops the longitudinal travel of the workpiece and having a grooved rest portion 23 that carries the workpiece.

Figure 3:
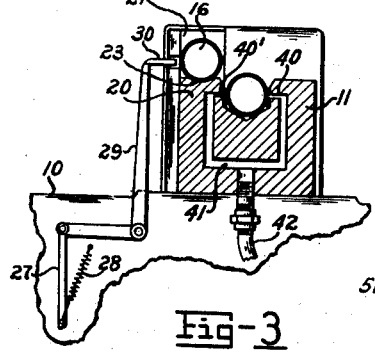
Fig. 3 is a vertical section on a larger scale on the line 3—3 of Fig. 1.

At the proper time in the sequence of operations, a timing cam 31 on a shaft 24 driven by motor 25 permits clockwise rocking movement of an angle lever 26 which is pivotally supported at 26'. The outer end of lever 26 is pivotally connected to a rod 27 which is thus elevated by a spring 28, rocking the bell crank lever 29 clockwise. The upper end of this lever is provided with a push plate 30 operable through an opening in the side wall of the stand 20, as shown in Fig. 3, so that the workpiece is pushed off of the stand and travels down into a trough just back of the gauging station. Subsequently, the continued rotation of the shaft 24, through a cam 31, permits counter-clockwise rocking movement of a feed lever 32 which is moved by compression spring 33 engaging the end of a feed plunger 34 which is connected through a pin and slot connection to the upper end of the lever 32. When the plunger 34 moves towards the left, as viewed in Fig. 1, it pushes the work-piece along the trough into the gauging station and the workpiece that was previously in the gauging station is pushed out by the advancing workpiece so that the gauged workpiece is moved on to an inclined guide 36. The descent of the gauged workpiece down this guide is controlled by a number of gates or movable doors, so that according to whichever gate is open the descending workpiece travels into the proper group and is segregated from others of a different size. The gates are controlled by solenoids or the like and these solenoids are controlled by electric circuits that are automatically controlled during the gauging operation in accordance with the size of the workpiece. As shown, there are six gates along the guide 36 and if all these gates are down, the workpiece travels along to a receptacle 37. The six gates and the receptacle 37 thus divide the gauged workpieces into seven different groups according to size, it being understood that below each of the six different gates is a suitable collector or box segregating those passing through any gate from the others.

Figure 5:
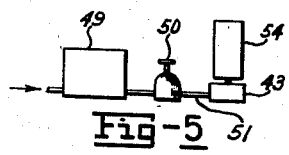
Fig. 5 is a diagrammatic view showing the fluid connections between the air pressure supply source and the pressure chamber or manifold.

The gauging of the size of the workpiece is by means of a fluid discharge orifice or nozzle through which a leakage of air or other fluid takes place to an extent determined by the size of the workpiece. This orifice or nozzle is provided on a part adapted for interfitting association with the workpiece, and where the parts to be gauged are of comparatively small size the orifice or nozzle is preferably, as herein shown, on a workpiece holder at the gauging zone to which the workpieces are successively applied. The gauging orifice may be directly controlled by the surface of the workpiece to control the amount of air flow through the orifice which controls the pressure existing in a fluid conduit connected to fluid pressure responsive elements and to a source of fluid under pressure with a flow restriction in the supply. As herein shown there are two of these gauging orifices 40 and 40' for cooperation with opposite sides of the workpieces and conjointly acting to control the pressure in a passage 41, connected to a tube 42 extending to a manifold block 43 which has a passage 44 in communication with other branch passages 45, 46 and 47. The capacity of these passages is small as they are of short length and small diameter. Air is supplied from a suitable pressure regulator 49, see Fig. 5, through a restriction valve 50 and pipe 51 to the passage 44 in the block 43 and leaks out through the gauging orifices 40 and 40', the amount of leakage being determined by the size of the workpiece. The faces of the gauging nozzle or orifices 40 are spaced slightly outwardly of the surface of the workpiece so that some small amount of air leakage will take place when a workpiece of large size is placed in the gauging station and more flow will take place with a workpiece of smaller size. The gauging orifice or orifices are located midway between the ends of a workpiece in the gauging station if it is desired to gauge that particular portion of the workpiece, although obviously the gauging orifices can be arranged at any point between the ends of the workpiece in accordance with gauging requirements. They may be arranged to check the diameter in a diametric plane or for checking average diameter at any given location, according to particular requirements.

Air supplied under controlled pressure through pressure regulator 49 passes through the restriction valve 50 which places the passage 44 under a pressure that is determined by the amount of leakage taking place through the gauging orifices, and a measurement of the pressure in the passage 44 will be a measurement of the amount of leakage, and thus a measurement of the size of the workpiece. This measurement of the pressure in the passage 44 is obtained by means of three pressure responsive electric gauge heads 52, 53 and 54 although more or less than this number of gauge heads could be employed depending upon the number of groups into which the workpieces are to be classified. These gauge heads comprise pressure responsive elements and circuit controlling elements that are adjustable in accordance with the particular dimensions to be selected. The gauge head 53, for example, comprises a casing 56 which has a projection 57 provided with an attachment nut 58 that is screwed into the block 43 to support the casing 56 on the block. The projection 57 has a passage communicating with the fixed end of a pressure responsive element, illustrated as a curved hollow expansion tube 59 such as a Bourdon tube. The free end 60 of this tube is fixed to a rigid finger 61 projecting a substantial distance generally away from the anchorage or fixed end of the pressure responsive tube. The upper end of this finger 61 is provided with lugs 62 and 63 of suitable insulating material, and these lugs have a motion towards the right or left as the pressure changes in the tube. The motion of the free end of the tube is a combined annular bodily movement and tilting movement and the combination of these two movements is so related to the direction in which the finger 61 projects, and to the location of the upper end of that finger, that the movement of the upper end of finger 61 is directly toward or from the electrical switches 64 and 65 arranged on opposite sides of the arm. The switch 65, as shown, comprises a rigid metal strip 66 provided with a slot or passage in line with the lug 63 so that the lug can extend freely through the strip 66 and operate against the flexible spring blade 67, the spring blade 67 having normal spring bias tending to hold its contact point against the contact point on the strip 66. The lug 63 may force the spring blade 67 outwardly, in which case a circuit that is normally closed by the contacts is broken. The strip 66 and the spring blade 67 are both mounted on a rather stiff spring blade 68 which may have an integral connection to strip 66 and which is fixed on a lug 69 projecting from one side of the housing, this short spring blade 68 applying a normal bias to strip 66 urging it to the left as viewed in Fig. 4 and thus holding its outer end in contact with a longitudinally adjustable stop or screw 70. The stop 70 is threaded in a hollow threaded plug 71 and is attached to a knob 72 so by turning the knob 72 the position of the stop 70 can be changed.

Figure 4:
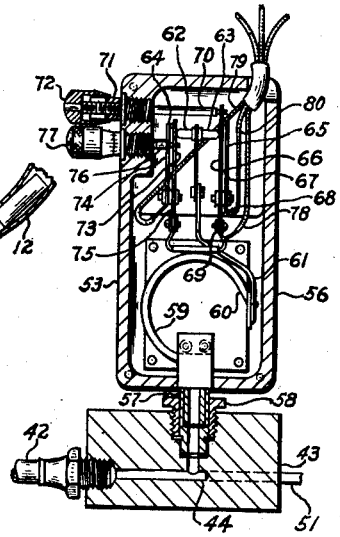
Fig. 4 is a vertical sectional view on a larger scale of one of the pressure switches.

The switch 64 is similar to the switch 65, having a rigid strip 73 provided with a passage receiving the lug 62, and being arranged adjacent and normally in contact with the spring strip 74, the two switch elements being yieldingly carried on a short spring strip 75 which may have an integral connection to the strip 73 and which gives a normal bias to the left as viewed in Fig. 4. The spring strip 74 has a passage that freely receives an adjustable stop or screw 76 operated by the knob 77, the end of the stop 76 engaging the left hand side of the rigid strip 73 and locating that strip in any desired position of adjustment. The setting given to the knobs 72 and 77 determines the extent of movement of the finger 61 required before breaking one switch after closing the other. In its normal position with only comparatively low pressure applied to the pressure responsive element, the finger 61 will hold the spring blade 67 away from contact with the strip 66. The two rigid strips 73 and 66 of the two switches are electrically connected together by a wire 78, and the two flexible spring strips 74 and 67 are connected to two other wires 79 and 80 respectively. It will be apparent that all of the moving parts including the pressure responsive element, the finger 61 and the switches operate without mechanical friction and with no lost motion, yet the magnification of the movement obtained and transmitted to the effective switch controlling portion is large and is provided by a very compact and simple arrangement to give an extremely sensitive and reliable construction capable of repeating time after time with exactness and precision.

The end of the air pressure responsive tube may, if desired, be provided with suitable operating means for moving an indicating pointer, not shown, operable along a scale visible on the side of the gauge head to give a visual indication of the amount of pressure at any time but the use of such an indicator is not necessary.

The gauge heads 52 and 54 are of similar construction, and equal or similar movements of the several switch operating fingers of the several gauge heads will take place at the same time. However, the three gauge heads have their rigid switch strips located at different settings so that different degrees of movements of the fingers are required before operating the switches.

The preliminary gauging operation produced by the gauging device 13 ensures that all of the workpieces that travel to the main gauging station can be received in the gauging station and enter between the two gauging orifices, and determines the maximum and minimum dimensions that can exist in the various workpieces that are subsequently gauged, selected or subdivided by the air pressure sizing devices.

This preliminary gauging operation may, for example, permit the continued passage of workpieces having a size of 1.000" up to 1.007" and separate all of the others out of the line of advance. The gauging operation at the main gauging station may then divide these parts into seven different groups each having a ranging of .001" although, of course the size range in any group may be made to accommodate the particular size requirement and may be greater or less than the figures mentioned. Thus the gauge head 52 may control the path of travel along the gravity guide depending on whether or not the two switches of this gauge head are closed or which is open. The switches of this gauge head may be set so that workpieces having a size of 1.000" up to 1.001" are not deflected by any gate and travel to the collector 37, one of its switches, the normally open switch 108 remaining open. The solenoid 84 controlled by the other switch 109, if open, may raise the gate 84g if the workpiece is between 1.006" and 1.007". Any workpieces between 1.001" and 1.006" would cause both of the two switches 108 and 109 to close. The gauge head 53 would be effective to control solenoids 86 and 87 and their respective gates 86g and 87g if one or the other of the two switches 64 and 65 does not maintain its normal position, which is with switch 64 closed and switch 65 open. The switch 65 would normally be open because the finger 62 would be moved over toward the right from a centered position if the pressure in the tube 59 is low because no workpiece is in place and there is no restriction by a workpiece to the flow of air from the gauging nozzle. With the switches 64 and 65 in their normal closed and opened positions respectively, neither of the solenoids 86 and 87 would be energized so that workpieces having a dimension of from 1.002" and 1.005" would not be segregated by either of the two gauge heads 52 and 53. The gauge head 54, however, can be set so that in the position shown it controls solenoid 88 and its switch controlling finger permits its normally open switch to close and cause its normally closed switch to open, to control the solenoids 88 and 89 unless the workpiece has a dimension of from 1.003" to 1.004" in which case neither one of those solenoids would be energized but another solenoid 90 would be energized and the parts between 1.003" and 1.004" would thus be divided from the others.

By employing a number of air pressure responsive size gauging elements all connected to a common passage subjected to a pressure which is in accordance with the size of the gauged object, it will be apparent that a desired gauging, or gauging and selecting of the workpieces can be accomplished without one gauge head affecting the operation of the others insofar as pressure application on the work and accuracy of operation are concerned. If a mechanical spring pressed plunger of a mechanical gauge were used with one ounce pressure against the work, for example, and then additional gauges were employed and operated from the same gauging plunger and each of those additional gauges required a one ounce pressure, then there would be a cumulative effect of all the pressures of the different gauges to give a much greater gauging pressure on the work. However, by using circuit controlling air pressure sizing elements with common connections to the passage 44, that passage being of rather small volume, the applied air pressure is equally effective on the several gauge heads. There would be no change in the system or in the accurate movement or setting of the gauging devices by the addition of other similar gauge heads to the common passage or manifold.

The apparatus provides the advantages of size measurement by measuring air leakage at a discharge nozzle cooperating with the work, with a pressure measurement by pressure responsive elements operating arms to control precision switches, and precision measurements can be obtained that will distinguish size variations of the order of a ten-thousandth of an inch. This accuracy of indication is present regardless of the number of pressure responsive elements connected in the system. The switches operate in a precise manner, since the adjustably fixed rigid blades of the switches are precisely set and do not flex at the time a contact is being made or broken. The arrangement provides great fidelity in the measurement of sizes, and will repeat time after time and operate over long periods of time without adjustment. It provides the extreme precision required where a series of different pressure responsive elements operate different switches, and these various switches cooperate with one another to determine the size ranges in which the parts are selected. Thus a particular size range may be determined for any one selection by a switch operated by one pressure responsive element or tube, with the other limit of this particular size range determined by another switch operated by another pressure responsive tube. The pressure responsive elements themselves do not need to be precisely alike, for each switch is independently adjustable as to setting so that it will make or break the circuit at the pressure corresponding to the particular size to which it is set.

It will be understood that in determining the maximum and minimum settings of the switches of any switch arm, masters are used having a size equivalent to the maximum and minimum limits of a predetermined range of sizes, and the adjusting knobs for the switches are then turned so that contact between a fixed blade and its movable blade is made at precisely the required point.

The gauging circuits are completed at the proper time in the sequence of operations under the control of two microswitches 91 and 92 operated by cams on the motor driven shaft 24 so that after the workpiece is in gauging position and its motion has stopped completely, then a power connection is established through the various gauging switches, controlling the time at which the various solenoids operate. Holding circuits are provided for the gate operating circuits to maintain the condition of the solenoid circuits for a sufficient time interval.

Figure 8:
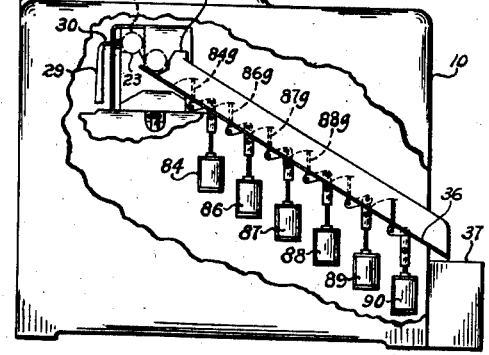
Fig. 8 is a timing chart showing the time sequence of operations.
Figure 6:
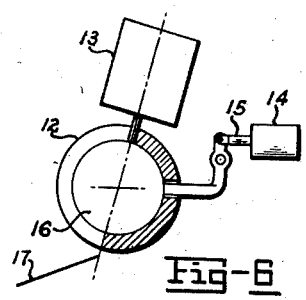
Fig. 6 is a view in section taken transversely of the supply tube at the preliminary gauging position.

The time chart illustrated in Fig. 8 shows the timing of the feed plunger 34 and indicates that after the feed plunger has returned from its forward feeding movement, a movement of the arm 29 takes place to move the next workpiece down into line with the plunger 34. After this movement and during the simultaneous energization of both the microswitches 91 and 92, the gauging circuits are energized to control the gates for segregating the workpieces according to size.

Figure 7:
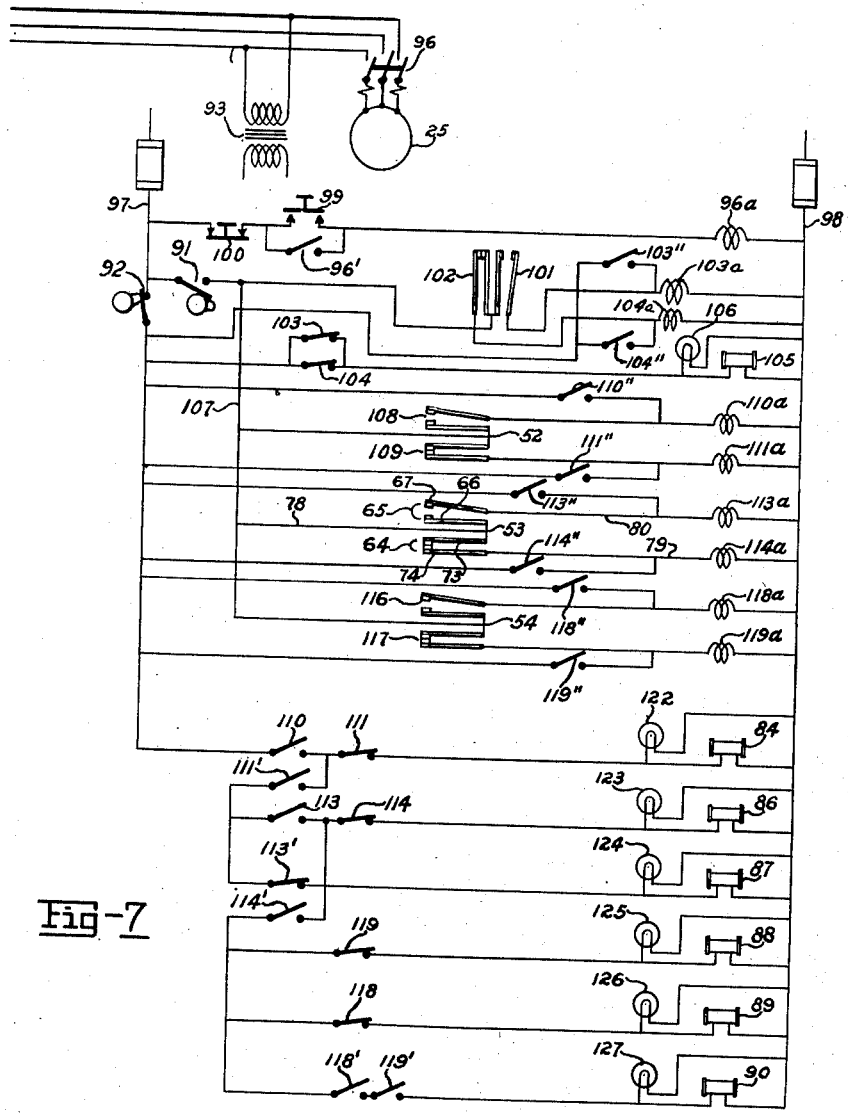
Fig. 7 is a wiring diagram of the apparatus.
Figure 8:
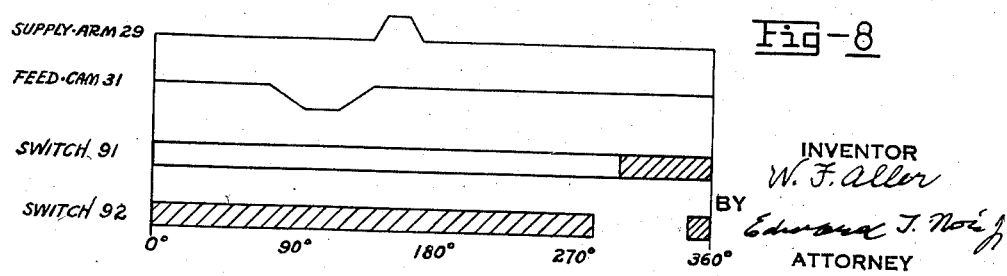

Referring more particularly to the wiring diagram of Fig. 7, the motor 25 is shown connected through a transformer 93 to a suitable power source, the motor being controlled by a coil 96a which is connected to the power supply lines 97 and 98 when the starting switch 99 is closed, stop switch 100 remaining closed. In the description of the diagram the relay magnet will be described as having a letter such as "a" following the number. The relay switches will be indicated by the corresponding numbers with or without superscripts. The holding switches will be indicated with corresponding numbers with double prime superscripts. Coil 96a when energized closes a holding switch 96' across the starting switch 99 and closes the starting switch 96 of the motor 25.

The microswitches 91 and 92 are connected as shown to the line 97, switch 91 having a connection to one side of the two switches 101 and 102 of the electrical gauging device 13 which performs the preliminary gauging operation. The switches 101 and 102 control coils 103a and 104a connected to the line side 98. Current will flow through the coil 103a if switch 101 closes and will flow through the coil 104a if switch 102 remains closed, and in the example previously given, the switches will both be closed unless the workpiece has a diameter less than 1.000" or greater than 1.007". The coils 103a and 104a respectively control switches 103, 103" and 104, 104". Switches 103 and 104 are normally closed unless their control coils are energized, and both connect in parallel to solenoid winding 105 which operates the ejecting plunger that moves the workpiece out of the line of advance in the supply tube 12. A lamp 106 is arranged across the solenoid winding 105 and is energized when the solenoid is energized to give a visual indication to the operator when the workpiece is moved out of the line of advance. The switches 103" and 104" are normally open but are closed to maintain holding circuits through the coils 103a and 104a when those coils are energized. These holding circuits are broken at the end of a gauging cycle by opening the cam operated microswitch 92.

When the microswitch 91 is closed, current from line side 97 flows to a wire 107 and thus to the two switches 108 and 109 of the gauge head 52. Switch 108 is the normally open switch, and is in series with a coil 110a that controls a switch 110, to close that switch when the coil 110a is energized and switch 109 is in series with a coil 111a that controls a switch 111 to open this switch when the coil is energized. The switches 110 and 111 are in series with the solenoid 24, which is energized if switch 108 is closed to energize coil 110a and close switch 110. The energization of solenoid 84 takes place, however, only while switch 109 is open (by a workpiece greater than 1.006" in the example used). If switch 109 is open no current flows through a coil 111a and switch 111 is therefore in its normally closed position shown. Under these conditions the larger size workpieces (1.006" to 1.007") will be trapped by the open gate 84g. At this time switch 111' is in its normally open position so no current flows over line 97 to energize any of the several circuits that control solenoids 86, 87, 88, 89 and 90. If switch 110 is not closed, the size being less than 1.001", the solenoid 84 will not be energized and no current flow can take place over line 97 through any of the solenoids and the workpiece travels to a receptacle 37 since it is not large enough to cause switch 108 to close, or in other words, in the example used, it is between 1.000" and 1.001". If the workpiece is between 1.001" and 1.006" switches 108 and 109 are both closed, switches 110 and 111' are closed, and switch 111 is open.

Additional switches 110" and 111" are provided in holding circuits in series with coils 110a and 111a respectively to keep the coils energized more than momentarily.

The switches 65 and 64 of gauge head 53 are connected through lead wire 78 and wire 107 through microswitch 91 to the supply line 97, and are connected respectively to coils 113a and 114a. These coils control holding circuit switches 113" and 114" respectively, and also control switches 112, 114, 113' and 114', the same reference numeral being used for a switch as for the coil that controls it. If the workpiece is large enough to open switch 64 (1.005+") coil 114a is deenergized and 114 is closed, energizing relay 86 through closed switch 113 (since coil 113a is energized through closed switch 65).

If the workpiece is small enough to keep switch 65 open (1.002—") switch 113' stays closed and solenoid 87 is energized. All workpieces between 1.002" and 1.005" are selected by the circuits controlled by gauge head 54, switches 114', 113, 111' and 110 being closed.

If the workpiece is not large enough to permit switch 116 of gauge head 54 to close (1.003—") coil 118a is not energized and its switch 118 stays closed, energizing solenoid 89. If the workpiece opens switch 117 (1.004+") coil 119a is deenergized closing its switch 119 and energizing solenoid 88. If both switches 116 and 117 are closed and coils 118a and 119a energized, switches 118' and 119' will be closed thus energizing solenoid 90 (1.003" to 1.004—").

Obviously the particular dimensions of each size range in the selected groups can be of any value as the adjustments provided for the opening and closing settings of the switches of all the gauge heads can be readily adjusted individually without affecting other settings.

Figure 2:
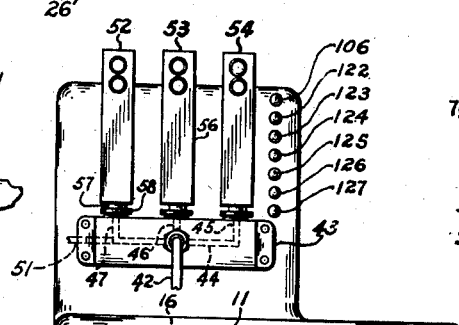
Fig. 2 is a front elevation of the apparatus, with a portion of the front wall removed.

Each of the solenoids that operate the segregating gates may have a lamp bulb connected across it so that the operator can see, by noting the lamps during successive gauging operations, how the parts are being grouped. For this purpose the solenoids 84, 86, 87, 88, 89 and 90 are provided with lamp bulbs 122, 123, 124, 125, 126 and 127 respectively, as indicated in Figs. 7 and 2. Switches 118" and 119" are provided in holding circuits in series with the coils 118a and 119a respectively to keep the coils energized more than momentarily.

As will be noted from Fig. 8, switches 91 and 92, controlled by the motor driven cam, are simultaneously energized only during a comparatively small time in the cycle of operations, thus supplying current at that time to the several gauge heads which establish or condition the circuits to the solenoids. Then the supply of current to switch 91 is interrupted but since the switch 92 is held closed, the several holding circuits maintain the condition of the solenoid circuits until after the following workpiece has pushed the gauged workpiece out of the gauging position and brought a new workpiece into gauging position.

It will be obvious that the invention is susceptible of many uses and modifications, and that any number of gauge heads can be employed in accordance with the requirements of any particular gauging operation. The fluid connections between the chamber or passage 44, the leakage nozzle at the gauging position, and the pressure responsive device of the gauge heads may be made quite short and of small capacity so a very rapid stabilization of pressure conditions takes place. In view of the simplicity of the apparatus, and the convenient adjustment of all of the circuit control elements of the gauge heads, individually, the differences in the dimensions of the several groups into which the workpieces are to be selected can be of any desired value.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging and selecting apparatus comprising a workholder having a gauging station and a discharge guide so arranged that as a workpiece is supplied to the gauging station it pushes a previously gauged workpiece to the discharge guide, a series of selector gates in the discharge guide determining the line of travel of the gauged workpiece, control means for each gate, a gauging fluid leakage nozzle in the work holder at the gauging station such that flow of fluid therethrough is determined by the size of the workpiece, a plurality of air pressure responsive curved tubes expansible and contractible in accordance with the air pressure supplied thereto, a pair of switches controlled by each of said tubes, one fluid conduit connected to all of said tubes and to said nozzle to subject said tubes to the same fluid pressure as determined by said nozzle, said conduit adapted to be supplied with fluid under controlled pressure, and means controlled by said switches for controlling the operation of said gates to select the workpieces according to size.

2. Gauging and selecting apparatus comprising a work holder having a gauging station and a discharge guide for receiving gauged workpieces, a series of selector gates in the discharge guide determining the line of travel of the gauged workpiece, a gauging fluid leakage nozzle in the work holder at the gauging station such that flow of fluid therethrough is determined by the size of the workpiece, means for supplying air under pressure to said nozzle, a plurality of air pressure responsive curved tubes each having a fixed end and a closed free end having expansive movement in accordance with pressure changes, means establishing communication between the fluid leakage nozzle and the interior of said curved tubes, an arm on the free end of each curved tube, a pair of individually adjustable switches controlled by each arm one at each side thereof, an electric circuit for each of said switches, and means controlled by said circuits for controlling the operation of said gates to select the workpieces according to size.

3. Gauging and selecting apparatus comprising a work holder having a gauging station and a gravity discharge guide so arranged that as a workpiece is supplied to the gauging station a previously gauged workpiece is moved to the gravity discharge path, a series of selector gates in the discharge guide determining the line of travel of the gauged workpiece, control means for each gate, a gauging fluid leakage nozzle in the work holder at the gauging station such that flow of fluid therethrough is determined by the size of the workpiece, a series of switches arranged in pairs, fluid pressure responsive elements each controlling a pair of switches, a fluid conduit having connections to each of said elements and to said leakage nozzle, means for supplying fluid under controlled pressure to said conduit, and means controlled by said switches for controlling the operation of said gates to select the workpieces according to size.

4. A gauging and selecting apparatus comprising a work holder having a gauging station, a discharge guide, means for supplying workpieces one at a time to said gauging station, the gauging station being so arranged that the supply of one workpiece to the gauging station moves the previously gauged workpiece to the discharge guide, a series of selecting gates in said discharge path determining the line of travel of the gauged workpieces, control means for each gate, a gauging fluid leakage nozzle in the work holder at the gauging station such that flow of fluid therethrough is determined by the size of the workpiece, a series of switches arranged in pairs and each switch having a flexible blade and an adjustable strip, fluid pressure responsive elements each controlling a pair of switches, a common fluid conduit having connections to all of said elements and to said leakage nozzle to subject all of said elements to the same fluid pressure as determined by said nozzle, means for supplying fluid under controlled pressure to said conduit, and means controlled by said switches for controlling the operation of said gates to select the workpieces according to size.

5. Gauging and selecting apparatus comprising supply means through which a line of workpieces are supplied to a work holder, a work holder having a gauging station, a discharge guide, means for supplying the workpieces one at a time to the gauging station, gauging means for gauging a workpiece while it is in the supply means and including an ejecting device for ejecting workpieces that do not conform to a predetermined size requirement, the gauging station being arranged so that the supply of one workpiece moves the previously gauged workpiece to the discharge guide, a series of selector gates in the discharge guide determining the line of travel of the gauged workpieces, a gauging fluid leakage nozzle in the work holder at the gauging station such that flow of fluid therethrough is determined by the size of the workpiece, a series of switches arranged in pairs with one pair for each of said gates, fluid pressure responsive elements one controlling each pair of switches, a fluid conduit connected to said nozzle and to each of said elements, means for supplying fluid to said conduit, and means controlled by each of said switches controlling the operation of each of said gates to select the workpieces according to size.

6. Gauging and selecting apparatus comprising a work holder having a gauging station to which workpieces are adapted to be supplied, a discharge guide for receiving the workpieces from the gauging station, a series of gates in said discharge guide determining the line of travel of the workpieces, control means for each gate, fluid pressure controlling gauging means at the gauging station operable in accordance with a dimension of the workpiece, a fluid pressure conduit for containing fluid under pressures which are controlled by said gauging means, a series of pressure responsive elements connected to said conduit, a series of switches arranged in pairs with each pair controlled by one of said elements, the two switches of one pair of switches having connections to two of the control gates for selecting workpieces that are larger and that are smaller than a predetermined range of sizes, and the two switches of another pair of switches having connections to other control gates for selecting workpieces that are larger and that are smaller than another predetermined size range which is within the maximum and minimum limits of the first named range of sizes.

7. Gauging and selecting apparatus comprising a work holder having a gauging station, selecting means for selecting the gauged workpieces according to the difference in their gauged dimensions, a gauging fluid leakage nozzle in the work holder at the gauging station such that flow of fluid therethrough is determined by the dimension of the workpiece, a series of fluid pressure responsive expansible elements, a switch controlled by each of said expansible elements, one fluid conduit having connections to all of said expansible elements and to said leakage nozzle to subject said elements to the same fluid pressure as determined by said leakage nozzle, means for supplying fluid under pressure to said conduit and providing a flow restriction in said supply, and means controlled by said switches for controlling said selecting means for the selection of workpieces of different dimensions.

8. Gauging apparatus of the type having a gauging fluid leakage orifice such that flow of fluid therethrough is determined by a dimension of the workpiece, said apparatus comprising a gauging station having a work engaging member provided with a fluid leakage orifice, a plurality of fluid pressure responsive expansible elements, two electric switches controlled individually by each of said expansible elements, means for individually adjusting each of said switches to set the various switches for effective operation at different pressures applied to said expansible elements, the various switches of the expansible elements subdividing a range of sizes into precisely determined increments, one fluid conduit having connections to said leakage orifice and to all of the expansible elements to subject said elements to the same fluid pressure, means for supplying fluid under pressure to said conduit with a flow restriction in the supply, and gauging circuits controlled by said switches.

9. Apparatus as claimed in claim 8 together with selecting means in each of the gauging circuits and controlled by said switches.

WILLIS FAY ALLER.

REFERENCES CITED

The following references are of record in the file of this patent:

UNITED STATES PATENTS

| Number | Name | Date |
|---|---|---|
| 2,001,447 | Balsiger | May 14, 1935 |
| 2,254,812 | Aller | Sept. 2, 1941 |
| 2,278,800 | Rodanent | Apr. 7, 1942 |
| 2,295,399 | Hanna | Sept. 8, 1942 |
| 2,382,885 | Landay | Aug. 14, 1945 |
| 2,421,484 | Diamond | June 3, 1947 |
| 2,488,037 | Rupley | Nov. 15, 1949 |